United States Patent Office 3,558,646
Patented Jan. 26, 1971

3,558,646
2-OXO-3-INDOLINYLIDENE HYDRAZIDES
OF ALKANOIC ACIDS
Francois T. Bruderlein, Montreal, Quebec, Canada, assignor to American Home Products Corporation, New York, N.Y., a corporation of Delaware
No Drawing. Filed June 17, 1968, Ser. No. 738,380
Int. Cl. C07d 27/40
U.S. Cl. 260—325                            51 Claims

ABSTRACT OF THE DISCLOSURE

There are disclosed herein the 2-oxo-3-indolinylidene hydrazides of butyric, isobutyric, isovaleric, 3,3-dimethylbutyric, hexanoic, decanoic, cyclopropanecarboxylic, cyclobutanecarboxylic, cyclopentanecarboxylic, and cyclohexanecarboxylic acids, optionally substituted in position 1 with methyl or phenyl groups and in position 5 with bromo or nitro groups.

The compounds are useful as anti-convulsant and anti-inflammatory agents of low toxicity, and methods for their preparation and for their use are also disclosed.

---

This invention relates to 2-oxo-3-indolinylidene hydrazides of alkanoic and cycloalkanoic acids of the following formula:

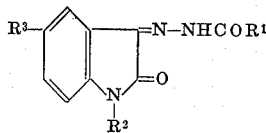

in which $R^1$ represents a lower alkyl group containing from 3–9 carbon atoms or a cycloalkyl group containing from 3–6 carbon atoms, $R^2$ represents hydrogen, a lower alkyl group containing from 1–4 carbon atoms, or the phenyl group and $R^3$ represents hydrogen, a halogen atom or the nitro group.

It will be obvious to those skilled in the art that the compounds of this invention may exist in two isomeric forms, viz., the syn and the anti-forms considering the phenyl ring as reference. These two structures are represented by Formulae II and III, respectively.

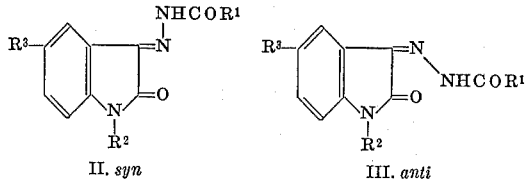

II. syn                   III. anti

These two isomeric forms may be prepared by different methods and can be purified by crystallization or chromatography. The structure of these compounds is established by comparing their U.V. and N.M.R. spectra with U.V. and N.M.R. spectra of the two β-guanylhydrazines of isatin, the structures of which have been established by chemical means (H. King and J. Wright, J. Chem. Soc. 2314, 1948).

The new and novel 2-oxo-3-indolinylidene hydrazides in this invention have been found to possess interesting pharmacological properties. More particularly, these compounds, in standard pharmacological tests for determining anti-convulsant activity, for example, in a procedure similar to that described by Berger in Proc. Soc. Exp. Biol. Med. 78, 277 (1951) or in the procedure similar to that described by Swinyard et al. in J. Pharmacol. 106, 319 (1952), protect animals against pentylenetetrazole or again electrostock and having shown utility as anti-convulsant agents.

Furthermore, the compounds of this invention, in standard pharmacological tests for determining anti-flammatory activity, for example, in a procedure similar to that described by Winter et al. in Proc. Soc. Exp. Biol. Med. 111, 544 (1962), have exhibited utility as anti-inflammatory agents.

When the compounds of this invention are employed as anti-convulsant or anti-inflammatory agents in warm-blooded animals, e.g., rats, alone or in combination with pharmacologically acceptable carriers, the proportion of which is determined by the solubility and chemical nature of the compound, chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The compounds of this invention are distinguished by possessing an exceptionally low order of toxicity.

The dosage of the present therapeutic agents will vary with the form of administration and the particular compound chosen. Furthermore, it will vary with the particular host under treatment. Generally, treatment, is initiated with small dosages substantially less than the optimum dose of the compound. Thereafter, the dosage is increased by small increments until the optimum effect under the circumstances is reached. In general, the compounds of this inveniton are most desirably administered at a concentration level that will generally afford effective results without causing any harmful or deleterious side effects and preferably at a level that is in a range of from about 20 mg. to about 200 mg. per kilo body weight, although as aforementioned variations will occur. However, a dosage level that is in the range of from about 50 mg. to about 100 mg. per kilo body weight is most desirably employed in order to achieve effective results.

More specifically, the compounds of this invention may be prepared by the following methods.

(A) Isatin or a 5-substituted or N-substituted or 5-N-disubstituted isatin of Formula IV, in the form of its alkali metal salt of Formula V, preferably the potassium or the sodium salt, is reacted with a substituted acid hydrazide of Formula VI in the absence of a solvent and within a temperature range of from 100° C. to 200° C. for a period of time from 30 minutes to 2 hours. The reaction mixture is dissolved in water, acidified to pH 3–5, and the corresponding 2-oxo-indolinylidene hydrazide is filtered or extracted with a water-immersible solvent. It is crystallized from lower aliphatic alcohols, dioxan, ethyl acetate or an alkoxy ethanol. This method gives the syn-form of the desired 2-oxo-3-indolinylidene hydrazide.

(B) Isatin or a 5-substituted or N-substituted or 5-N-disubstituted isatin of Formula IV is reacted with a substituted acid hydrazide of Formula VI, preferably in the presence of an acid catalyst such as, for example, small amounts of acetic or hydrochloric acid, with a lower aliphatic alcohol as solvent, within a temperature range of from 65° C. to 120° C. for a period of time of from 30 minutes to 2 hours. In this manner the anti-form of the desired 2-oxo-3-indolinylidene hydrazide is preferentially obtained. In some cases mixtures of syn- and anti-forms which are obtained may be separated either by crystallization or by chromatography. The anti-forms may be isomerized to the syn-forms by heating above the melting point or by heating with acid.

The following examples and formulae, in which $R^1$, $R^2$ and $R^3$ have the significance defined above and M represents an alkali metal, will illustrate this invention.

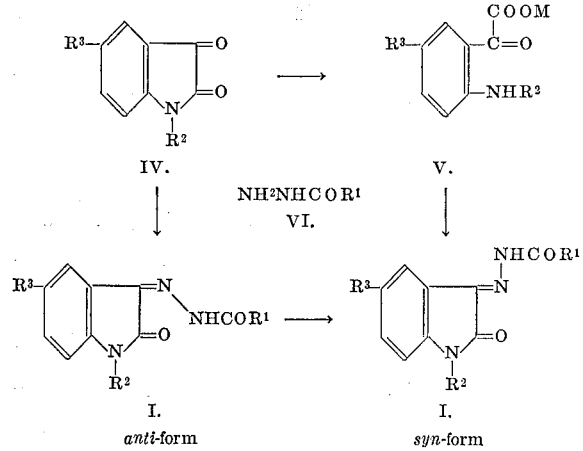

anti-form  syn-form

EXAMPLE 1

Potassium isatinate (0.1 mole, described by G. Stefanovic et al., Rec. Trav. Chim. Pays-Bas, 80, 149, 1961) is heated with 0.2 mole of butyric acid hydrazide at 120° for one hour. After cooling, the reaction mixture is treated with water, acidified with 10% aqueous hydrochloric acid and the solid is filtered off and recrystallized from ethanol-water to yield the butyric acid 2-oxo-3-indolinylidene hydrazide (syn-form), M.P. 152–154° C.

In the same manner, but using the hydrazides of isobutyric, isovaleric, 3,3-dimethylbutyric, hexanoic, decanoic (prepared from the corresponding ethyl ester and hydrazide hydrate at reflux temperature, M.P. 62–64° C.), cyclopropanecarboxylic, cyclobutanecarboxylic, cyclopentanecarboxylic, and cyclohexanecarboxylic acids instead of butyric acid hydrazide, the corresponding syn-forms of the 2-oxo-3-indolinylidene hydrazides of isobutyric acid (M.P. 163–164°), isovaleric acid (M.P. 146–147°), 3,3-dimethylbutyric acid (M.P. 194–196°), hexanoic acid (M.P. 113–114°), decanoic acid (M.P. 115–117°), cyclopropanecarboxylic acid (M.P. 205°), cyclobutanecarboxylic acid, cyclopentanecarboxylic acid and cyclohexanecarboxylic acid are respectively obtained.

The above compounds are also obtained by reacting isatin with one equivalent of the corresponding hydrazide in a mixture of ethanol and acetic acid (1:1) for 2 hours under reflux. After cooling and concentrating the reaction mixture crystallization from aqueous ethanol yields predominantly the anti-forms of the above compounds which are isomerized by heating with acetic acid for 1–3 hours at 90–120° C. to yield the corresponding syn-forms, identical with the compounds described above.

EXAMPLE 2

A mixture of isatin and one equivalent of butyric acid hydrazide in ethanol is refluxed for ½ hour. After cooling, the precipitate is filtered off and crystallized from ethanol to yield the butyric acid 2-oxo-3-indolinylidene hydrazide (anti-form), M.P. 190–192°.

In the same manner, but using the acid hydrazides enumerated in Example 1, the corresponding anti-forms of the compounds described in Example 1 are obtained.

EXAMPLE 3

In the same manner as described in Example 1, but using 5-nitroisatin instead of isatin, in the form of its potassium salt, and reacting it with the same hydrazides as enumerated in Example 1, the corresponding syn-forms of 5-nitro-2-oxo-3-indolyinylidene hydrazides of butyric (M.P. 280–281° C.), isobutyric, isovaleric, 3,3-dimethylbutyric, hexanoic, decanoic, cyclopropanecarboxylic, cyclobutanecarboxylic, cyclopentanecarboxylic, and cyclohexanecarboxylic acids are respectively obtained.

EXAMPLE 4

In the same manner as described in Example 1, but using 5-bromoisatin instead of isatin in the form of its potassium salt, and reacting it with the same hydrazides as enumerated in Example 1. The corresponding syn-forms of 5-bromo-2-oxo-3-indolinylidene hydrazides of butyric M.P. 247–248° C.), isobutyric, isovaleric, 3,3-dimethylbutyric, hexanoic, decanoic, cyclopropanecarboxylic, cyclobutanecarboxylic, cyclopentanecarboxylic, and cyclohexanecarboxylic acids are respectively obtained.

EXAMPLE 5

In the same manner as described in Example 2, but using N-phenylisatin instead of isatin and reacting it with the same hydrazides as listed in Example 1, the corresponding anti-forms of 1-phenyl-2-oxo-3-indolinylidene hydrazides of butyric, isobutyric, isovaleric, 3,3-dimethylbutyric, hexanoic, decanoic, cyclopropanecarboxylic, cyclobutanecarboxylic, cyclopentanecarboxylic, and cyclohexanecarboxylic acid are respectively obtained.

EXAMPLE 6

In the same manner as described in Example 1, but using N-methylisatin instead of isatin in the form of its potassium salt, and reacting it with the same hydrazides as listed in Example 1, the corresponding syn-form of 1-methyl-2-oxo-3-indolinylidene hydrazides of butyric (M.P. 117–119° C.), isobutyric, isovaleric, 3,3-dimethylbutyric, hexanoic, decanoic (M.P. 93–94° C.), cyclopropanecarboxylic, cyclobutanecarboxylic, cyclopentanecarboxylic, and cyclohexanecarboxylic acids are respectively obtained.

EXAMPLE 7

In the same manner as described in Example 2, but using N-methylisatin instead of isatin and reacting it with the same hydrazides as listed in Example 1, the corresponding anti-forms of 1-methyl-2-oxo-3-indolinylidene hydrazides of butyric, isobutyric, isovaleric, 3,3-dimethylbutyric, hexanoic, decanoic, cyclopropanecarboxylic, cyclobutanecarboxylic, cyclopentanecarboxylic, and cyclohexanecarboxylic acids are respectively obtained.

I claim:
1. A compound of the formula:

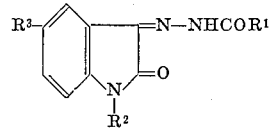

wherein $R^1$ represents a lower alkyl group containing from three to nine carbon atoms or a cycloalkyl group containing from three to six carbon atoms; $R^2$ represents hydrogen, a lower alkyl group containing from one to four carbon atoms, or the phenyl group; and $R^3$ represents hydrogen, a bromine atom or the nitro group.

2. A compound as described in claim 1 which is: butyric acid 2-oxo-3-indolinylidene hydrazide.
3. A compound as described in claim 1 which is: isobutyric acid 2-oxo-3-indolinylidene hydrazide.
4. A compound as described in claim 1 which is: isovaleric acid 2-oxo-3-indolinylidene hydrazide.
5. A compound as described in claim 1 which is: 3,3-dimethylbutyric acid 2-oxo-3-indolinylidene hydrazide.
6. A compound as described in claim 1 which is: hexanoic acid 2-oxo-3-indolinylidene hydrazide.
7. A compound as described in claim 1 which is: decanoic acid 2-oxo-3-indolinylidene hydrazide.
8. A compound as described in claim 1 which is: cyclopropanecarboxylic acid 2-oxo-3-indolinylidene hydrazide.
9. A compound as described in claim 1 which is: cyclobutanecarboxylic acid 2-oxo-3-indolinylidene hydrazide.
10. A compound as described in claim 1 which is: cyclopentanecarboxylic acid 2-oxo-3-indolinylidene hydrazide.

11. A compound as described in claim 1 which is: cyclohexanecarboxylic acid 2-oxo-3-indolinylidene hydrazide.

12. A compound as described in claim 1 which is: butyric acid 5-nitro-2-oxo-3-indolinylidene hydrazide.

13. A compound as described in claim 1 which is: isobutyric acid 5-nitro-2-oxo-3-indolinylidene hydrazide.

14. A compound as described in claim 1 which is: isovaleric acid 5-nitro-2-oxo-3-indolinylidene hydrazide.

15. A compound as described in claim 1 which is: 3,3-dimethylbutyric acid 5-nitro-2-oxo-3-indolinylidene hydrazide.

16. A compound as described in claim 1 which is: hexanoic acid 5-nitro-2-oxo-3-indolinylidene hydrazide.

17. A compound as described in claim 1 which is: decanoic acid 5-nitro-2-oxo-3-indolinylidene hydrazide.

18. A compound as described in claim 1 which is: cyclopropanecarboxylic acid 5 - nitro - 2-oxo-3-indolinylidene hydrazide.

19. A compound as described in claim 1 which is: cyclobutanecarboxylic acid 5-nitro - 2 - oxo-indolinylidene hydrazide.

20. A compound as described in claim 1 which is: cyclopentanecarboxylid acid 5-nitro - 2 - oxo-3-indolinylidene hydrazide.

21. A compound as described in claim 1 which is: cyclohexanecarboxylic acid 2 - nitro - 2 - oxo-3-indolinylidene hydrazide.

22. A compound as described in claim 1 which is: butyric acid 5-bromo-2-oxo-3-indolinylidene hydrazide.

23. A compound as described in claim 1 which is: isobutyric acid 5-bromo-2-oxo-3-indolinylidene hydrazide.

24. A compound as described in claim 1 which is: isovaleric acid 5-bromo-2-oxo-3-indolinylidene hydrazide.

25. A compound as described in claim 1 which is: 3,3-dimethylbutyric acid 5-bromo-2-oxo-3-indolinylidene hydrazide.

26. A compound as described in claim 1 which is: hexanoic acid 5-bromo-2-oxo-3-indolinylidene hydrazide.

27. A compound as described in claim 1 which is: decanoic acid 5-bromo-2-oxo-3-indolinylidene hydrazide.

28. A compound as described in claim 1 which is: cyclopropanecarboxylic acid 5-bromo-2-oxo-3-indolinylidene hydrazide.

29. A compound as described in claim 1 which is: cyclobutanecarboxylic acid 5 - bromo-2-oxo-3-indolinylidene hydrazide.

30. A compound as described in claim 1 which is: cyclopentanecarboxylic acid 5-bromo-2-oxo-3-indolinylidene hydrazide.

31. A compound as described in claim 1 which is: cyclohexanecarboxylic acid 5 - bromo-2-oxo-3-indolinylidene hydrazide.

32. A compound as described in claim 1 which is: butyric acid 1-phenyl-2-oxo-3-indolinylidene hydrazide.

33. A compound as described in claim 1 which is: isobutyric acid 1-phenyl - 2 - oxo-3-indolinylidene hydrazide.

34. A compound as described in claim 1 which is isovaleric acid 1-phenyl-2-oxo-3-indolinylidene hydrazide.

35. A compound as described in claim 1 which is: 3,3-dimethylbutyric acid 1-phenyl-2-oxo-3-indolinylidene hydrazide.

36. A compound as described in claim 1 which is: hexanoic acid 1-phenyl-2-oxo-3-indolinylidene hydrazide.

37. A compound as described in claim 1 which is: decanoic acid 1-phenyl-2-oxo-3-indolinylidene hydrazide.

38. A compound as described in claim 1 which is: cyclopropanecarboxylic acid 1-phenyl-2-oxo-3-indolinylidene hydrazide.

39. A compound as described in claim 1 which is: cyclobutanecarboxylic acid 1 - phenyl-2-oxo-3-indolinylidene hydrazide.

40. A compound as described in claim 1 which is: cyclopentanecarboxylic acid 1 - phenyl-2-oxo-3-indolinylidene hydrazide.

41. A compound as described in claim 1 which is: cyclohexanecarboxylic acid 1 - phenyl-2-oxo-3-indolinylidene hydrazide.

42. A compound as described in claim 1 which is: butyric acid 1-methyl -2-oxo-3-indolinylidene hydrazide.

43. A compound as described in claim 1 which is: isobutyric acid 1-methyl - 2 - oxo-3-indolinylidene hydrazide.

44. A compound as described in claim 1 which is: isovaleric acid 1-methyl - 2 - oxo-3-indolinylidene hydrazide.

45. A compound as described in claim 1 which is: 3,3-dimethylbutyric acid 1-methyl -2-oxo-3-indolinylidene hydrazide.

46. A compound as described in claim 1 which is: hexanoic acid 1-methyl-2-oxo-3-indolinylidene hydrazide.

47. A compound as described in claim 1 which is: decanoic acid 1-methyl-2-oxo-3-indolinylidene hydrazide.

48. A compound as described in claim 1 which is: cyclopropanecarboxylic acid 1-methyl-2-oxo-3-indolinyliden hydrazide.

49. A compound as described in claim 1 which is: cyclobutanecarboxylic acid 1-methyl -2-oxo-3-indolinylidene hydrazide.

50. A compound as described in claim 1 which is: cyclopentanecarboxylic acid 1-methyl-2-oxo-3-indolinylidene hydrazide.

51. A compound as described in claim 1 which is: cyclohexane carboxylic acid 1-methyl-2-oxo-3-indolinylidene hydrazide.

References Cited

FOREIGN PATENTS 1,026,401   4/1966   Great Britain _____ 260—325

ALEX MAZEL, Primary Examiner

J. A. NARCAVAGE, Assistant Examiner

U.S. Cl. X.R.

424—274